ANDRE A. JAECKLIN
INVENTOR.

BY Robert G. Clay

ATTORNEY

ANDRE A. JAECKLIN
INVENTOR.

BY Robert G. Clay

ATTORNEY

March 5, 1968 A. A. JAECKLIN 3,372,283

ATTENUATION CONTROL DEVICE

Filed Feb. 15, 1965

3 Sheets-Sheet 3

ANDRE A. JAECKLIN
INVENTOR.

BY Robert S. Clay

ATTORNEY

United States Patent Office 3,372,283

Patented Mar. 5, 1968

3,372,283

ATTENUATION CONTROL DEVICE

Andre A. Jaecklin, Palo Alto, Calif., assignor to Ampex Corporation, Redwood City, Calif., a corporation of California Filed Feb. 15, 1965, Ser. No. 432,500
12 Claims. (Cl. 307—83)

ABSTRACT OF THE DISCLOSURE

A transformer wherein attenuation of signals coupled between input and output windings on a core is controlled by varying the saturation of flux paths through the core between the windings. Very high level attenuation and a substantially linear attenuation control characteristic are obtained by the employment of a differential transformer configuration wherein input windings on two outer legs of a core are arranged to induce equal fluxes therein in directions of mutual opposition in a central leg of the core upon which an output winding is wound. Saturation inducing control windings in push-pull on legs interconnecting the outer and central legs vary the flux differential in the central leg to vary the attenuation of a signal coupled between the input and output windings in accordance with a control signal applied to the control windings. The transformer has varied utility as a slow switcher, automatic gain control, phase detector, analog adder, analog multiplier, etc.

This invention relates generally to control devices of the type wherein the magnetic coupling between a plurality of windings upon a ferromagnetic transformer core may be controlled by varying the saturation of flux paths through the core between the windings. The invention is more particularly directed to a saturation controlled differential transformer which is capable of imparting a relatively high degree of attenuation to signals coupled between the windings thereof while providing a substantially linear attenuation control characteristic, negligible phase shift, negligible interaction between control and controlled signals, and other advantageous features.

In numerous applications it is desirable to vary the attenuation of alternating current signals in an electrically controllable manner. For example, switching of an input signal to an output may be accomplished by controlling signal attenuation between the input and output. With high attenuation, the signal is in effect blocked or decoupled from the output, while for low attenuation the signal is transmitted or coupled to the output. Likewise, automatic gain control can be achieved by varying the attenuation of a signal path in accordance with an error signal proportional to departures of the level of a signal transmitted by the path from a reference.

Various control devices for electrically controlling attenuation in the foregoing, as well as other applications have been advanced heretofore, and in this regard one device for this purpose is disclosed in a copending application for U.S. Letters Patent of John F. Varnell, Jr., Serial No. 408,839, filed on November 4, 1964, for control Device, and assigned to the same assignee as that of the instant application. In basic respects the control device of said copending application includes a transformer core of a ferromagnetic material having a hysteresis loop of minimal squareness and area. The core has an aperture defining four legs, two opposed ones of which are provided with control slots so designed and placed that flux paths encircling each slot are substantially shorter than flux paths encircling the aperture. Input and output windings are respectively wound upon the two opposed unslotted legs while control windings are wound through the slots of the slotted legs. A direct current control signal applied to the control windings induces flux in the core encircling the slots of the slotted legs. This control flux saturates the slotted legs, and therefore the flux path encircling the aperture and coupling the input and output windings, in substantially direct relation to the control signal. The amount of flux induced in the core by a signal applied to the input winding linking the output winding is thus varied in accordance with the control current to correspondingly variable attenuate the signal coupled therebetween. A relatively large predetermined maximum control current imparts maximum attenuation to the signal to, in effect, decouple the input from the output and switch the signal off. Zero control current imparts negligible attenuation to the signal such that the same is coupled to the output with substantially complete effectiveness. For control currents between zero and maximum, the signal is proportionately attenuated. The latter characteristic of the control device has been employed to good advantage in automatic gain control applications. In this regard a control device is employed to attenuate a signal in compensatory relation to amplitude variations in a pilot component of the signal, such pilot being separated from the signal, rectified, and compared to a reference to develop an error signal which is in turn applied to the control windings to appropriately vary the signal attenuation.

It is, of course, desirable in the above as well as other applications that the control device be capable of reducing the signal substantially to zero, i.e., be capable of producing a very high level of attenuation approaching infinity such that the residual signal will be negligible. The maximum level of attenuation which can be produced by control devices in accordance with the previously referenced copending application is to some extent limited. The residual signal in slow switching as well as other switching applications while being tolerable, could be advantageously reduced.

It has been found that the limited maximum attenuation of the prior control device results from there being no alternative low reluctance flux path through which lines of flux induced by the input winding may pass during saturation (maximum magnetization) of the slotted control legs of the core. Instead, the lines of flux must pass through the control legs and couple with the output winding, or build up a fringing field around the input winding extending through an air flux path of relatively high reluctance. Thus, the flux has only two alternative paths through which to pass and both are of relatively high reluctance. This limits the amount of flux which may be diverted from the path linking the output winding and thereby limits the maximum attenuation of the input signal.

It is therefore an object of the present invention to provide improved saturation controlled magnetic control devices having relatively high signal attenuation capabilities due to core configurations providing alternative low reluctance flux paths for flux induced by signals flowing through input windings thereon and prevented from linking with output windings thereon through controllably saturable flux paths thereof.

Another object of the invention is the provision of saturation controlled magnetic control devices having slotted saturable control legs interconnecting more than two unslotted legs for receiving signal windings in order to provide alternative flux paths linking the signal windings.

Still another object of the invention is to provide a control device of the class described having signal windings in a differential transformer configuration and saturation inducing control windings in push-pull, to produce an output signal that is linearly proportional to control current over a wide range.

Yet another object of the invention is to provide a saturation controlled differential transformer control device which introduces negligible signal distortion due to phase and temperature effects, control windings/signal winding interaction, and the like.

It is a further object of the invention to provide a control device of the class described having varied utility as a slow switcher, automatic gain control, phase detector, analog adder, analog multiplier, etc.

Additional objects and advantages of the invention will become apparent upon consideration of the following description thereof in conjunction with the accompanying drawings, wherein.

Figure 1:
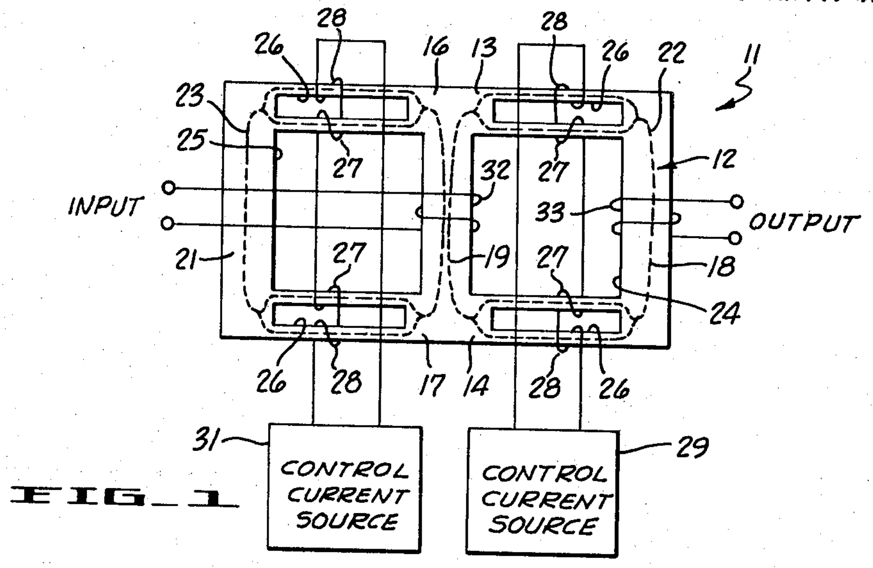
FIGURE 1 is a schematic illustration of a saturation controlled magnetic control device in accordance with the invention.

Referring now to FIGURE 1 of the drawings, a control device in accordance with the invention will be seen to include a core 12 of ferromagnetic material having a hysteresis loop of minimal squareness and area. The configuration of the core is such as to define pairs of opposed slotted leg portions 13, 14 and 16, 17 respectively interconnecting the opposite ends of a plurality of unslotted leg portions 18, 19, and 21 to provide a plurality of closed loop flux paths 22 and 23 through the core. The core is preferably rectangular with spaced rectangular apertures 24 and 25 formed therein to define the slotted and unslotted legs. The unslotted legs 18, 19, and 21 are in this case disposed in successive parallel spaced relation, the pair of slotted legs 13 and 14 right angularly connecting the ends of leg 18 to the ends of leg 19 and the pair of slotted legs 16 and 17 right angularly connecting the ends of leg 19 to the ends of leg 21. It will be appreciated that core configurations other than rectangular may be alternatively employed. In any event, a plurality of closed loop flux paths are provided through the core, path 22 being defined by unslotted legs 18 and 19 in series with slotted legs 13 and 14, and path 23 being defined by unslotted legs 19 and 21 in series with slotted legs 16 and 17. The slots 26 of legs 13, 14, 16, and 17 extend longitudinally centrally thereof and are preferably outwardly offset from the central leg 19. In this regard, the outer ends of the slots are preferably aligned with the outer ends of apertures 24, 25 while the inner ends of the slots are outwardly spaced from the inner ends of the apertures.

Control windings 27 and 28 are received by the slots 26 of the respective legs 13, 14, 16, and 17, the windings being wound with opposite senses on opposite longitudinal sides of each slot. The control windings on the legs 13, 14 on one side of the core are connected, for example, in series with a control current source 29, while the windings on the legs 16, 17 on the other side of the core are similarly connected to a second control current source 31. Although separate control signal sources 29, 31 are employed with the instant embodiment of the control device, it will become apparent from the ensuing description that various modifications may be made to permit energization of the windings from a common source, i.e., provision may be made for single ended energization of the control windings. In any event, in response to the flow of control current through the windings 27, 28 carried by each slotted leg, control flux is induced therein encircling the slot. The reluctance of the corresponding leg is varied in direct relation to the control current up to a value approaching saturation of the leg whereat the reluctance is a maximum. Thus, the reluctance of the respective closed loop flux paths 22, 23 linking the legs 18, 19, and 21 may be selectively varied in accordance with the control current.

Signal windings are provided upon a central unslotted leg 19 and at least one of the unslotted legs 18, 21 outwardly thereof. In the illustrated embodiment, an input signal winding 32 is wound upon leg 19 while an output signal winding 33 is wound upon leg 18, flux path 22 thus linking the input and output windings and flux path 23 providing an alternative path which is selectively of low reluctance for flux induced by the flow of signal current through the input winding. Signal windings may be alternatively provided on all of the unslotted legs in various applications of the control device.

The control device provided with input and output signal windings 32 and 33 upon legs 19 and 18 as described above, is particularly useful as a switch for on-off switching applications or as a signal attenuator for automatic gain control or equivalent applications. More particularly, for use as a switch, an input signal is applied to winding 32, and saturating control current of relatively high magnitude is applied to the control windings associated with the slotted legs on one side of the core while zero control current is applied to the control windings associated with the slotted legs on the other side of the core. To turn the switch on, and couple the input signal to the output winding 33, control signal source 29 applies zero control current to windings 27, 28 carried by legs 13, 14 while source 31 applies saturating control current to legs 16, 17. The flux paths 22 and 23 at this time thus have relatively low and high reluctances respectively. Substantially, all of the signal flux induced in leg 19 passes through the low reluctance path 22 and links with the output winding 33 to induce an output signal therein with minimum attenuation. The switch is turned off and the input signal is decoupled from the output winding upon reversing the conditions of energization of the control windings. Zero control current is applied to the windings of legs 16, 17 while saturating current is applied to the windings of legs 13, 14. Flux path 22 now has relatively high reluctance while path 23 has low reluctance. The majority of the signal flux passes through the path 23 with only a very negligible portion passing through the path 22 and linking the output winding. Thus an output signal of substantially zero level is induced in winding 33, and the switch may be said to be turned off. In a similar manner, output windings may be provided on both outer legs 18 and 21, and a signal selectively switched from the input windings to either of the output windings. Likewise, input windings may be provided on the outer legs and an output winding provided on the center leg to facilitate selective switching of a pair of signals to a common output.

In the use of the control device as a linear attenuator, the control sources 29, 31 apply control currents which respectively have absolute values varying in opposite directions to the windings associated with the slotted legs on opposite sides of the core. For example, if the absolute value of control current from source 29 increases with respect to time, the absolute value of control current from source 31 decreases with respect to time by an equal amount, and vice versa. For linear attenuation service, the control currents are of relatively low level in order that the reluctance of the slotted legs is varied within the linear portion of the saturation curve thereof. An input signal applied to winding 32 is thus attenuated in a linear fashion in being coupled to output winding 33, in accordance with the control current applied to the control windings 27, 28.

Figure 2:
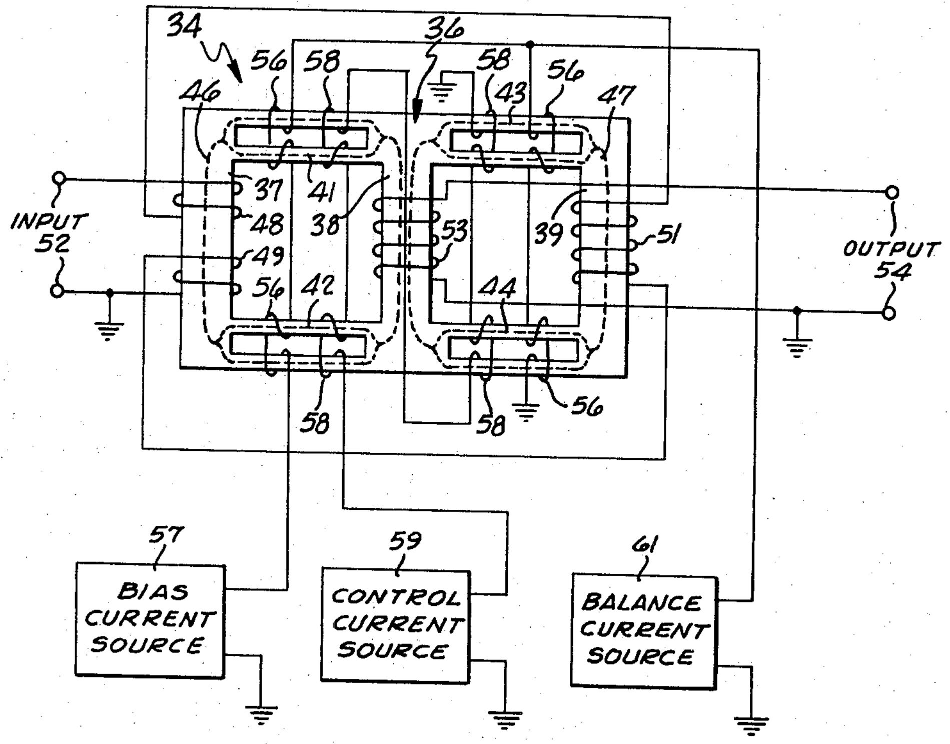
FIGURE 2 is a schematic illustration of a preferred embodiment of the control device in the form of a saturation controlled differential transformer.

It is to be noted that the control device 11 of FIGURE 1, is useful for on-off switching or linearly variable attenuation, but not for both of these functions simultaneously. The control characteristic possesses good linearity only for relatively small magnitudes of control current and becomes highly unlinear for current magnitudes substantially less than that corresponding to maximum attenuation. The control device 11 accordingly is not particularly well suited to the slow switching of signals linearly between substantially zero and full magnitude. However, the device may be modified in the manner depicted in FIGURE 2 which illustrates a saturation controlled differential transformer control device 34 which is likewise capable of the on-off switching and linearly variable attenuation functions of the control device 11, as well as being useful in numerous other applications.

Considering now the differential transformer control device 34 in more detail, it is to be noted that the device includes a core 36 which is identical to the core 12 of the device 11 and accordingly is not described in further detail herein. The core includes parallel spaced unslotted legs 37, 38, 39, with legs 37, 38 being interconnected at their ends by slotted legs 41, 42, and legs 38, 39 being interconnected at their ends by slotted legs 43, 44. Closed loop flux paths 46, 47 are thus provided through opposite sides of the core having the center leg 38 in common. More particularly, the path 46 is defined by unslotted legs 37, 38 in series with slotted legs 41, 42, and path 47 is defined by unslotted legs 38, 39 in series with slotted legs 43, 44.

In accordance with the differential transformer arrangement of the control device 34, split input windings 48, 49 are wound upon leg 37 and serially connected to an input winding 51 wound upon leg 39. The sense of each of the primary windings is such that an alternating voltage input signal applied across input terminals 52 connected to the opposite ends of the series arrangement of windings induces flux in the flux paths 46, 47 in directions which oppose each other in the common center leg 38. With the input windings 48, 49 and the input winding 51 on opposite sides of the core balanced, and the reluctances of the flux paths equal to each other, the opposing flux of the respective paths in the center leg cancel out such that this leg is free of flux. Hence, an output winding 53 wound upon the center leg 38 and having its opposite ends connected to output terminals 54 produces no output thereat in response to the opposite sides of the control device being balanced. Responsive to unbalance of the reluctance of the respective flux paths, the flux in the center leg is proportional to the reluctance differential, as is therefore the output signal at terminals 54. By varying the saturation of slotted legs 41, 42 relative to slotted legs 43, 44 to effect a differential in reactance therebetween, the attenuation of an input signal applied to terminals 52 in being coupled to output terminals 54 is correspondingly varied in accordance with the differential.

It will be appreciated that the differential transformer control device described above in its balanced state is by its nature very sensitive to slight departures from the balanced state. Therefore, with control windings provided on the slotted legs of the opposite sides of the core of the differential transformer in a double ended arrangement of the type employed in the embodiment of FIGURE 1, it will be appreciated that the device would be very sensitive to slight changes in control current, as can be produced by drift, and tend to be unstable. The problem is overcome in the differential transformer control device 34 by the incorporation therein of a push-pull control winding arrangement having a single ended drive. In this regard, bias windings 56 are wound upon the respective slotted legs 41, 42, 43, 44 and are connected in series with a bias current source 57 which produces a constant direct current bias. Control windings 58 are also wound upon the respective slotted legs and are connected in series with a control current source 59. The polarity of the control current with respect to the bias current, and the senses of the bias and control windings are selected such that the bias and control current magnetization in the slotted legs 41, 42 of the flux path 46 on one side of the core add, whereas the magnetizations in the slotted legs 43, 44 of the flux path 47 on the other side of the core subtract. In this manner an output signal is produced at terminals 54 which is proportional to the control current, and it has been found that the proportional relationship between output signal and control current may be made substantially exactly linear over a wide range by appropriate selection of the bias current. Thus, with zero control current applied to windings 58, and the same bias current applied to the windings 56 on opposite sides of the core, the flux should be cancelled in the middle leg and the output signal should be zero. However, due to deficiencies in the core material and asymmetry of the input signal windings, some unwanted signal may leak through to the output. The deficiencies may be readily compensated by means of a balance current source 61 connected to the center tap of the series arrangement of bias windings 56. The source 61 may be adjusted to add a small increment of compensating current to, or subtract an increment from the bias current in the windings on opposite sides of the core. As a result, the opposite sides of the core may be substantially exactly balanced such that any residual output signal for zero control current is negligible.

In addition to the advantages in linearity and maximum attenuation of the input signal provided by the differential transformer arrangement of the control device, it is to be noted that the device introduces a minimum of phase shift to signals coupled therethrough. This is due to factors contributing to phase shift being substantially balanced out by virtue of the differential arrangement of the input windings. The differential transformer arrangement is likewise effective in reducing interaction between the control windings and signal windings to a negligible amount. Moreover, the temperature coefficients of the opposite sides of the core are of relatively low order and substantially equal such that the differential arrangement of the control device is substantially independent of temperature.

Although the input windings on the outer legs of the core of the differential transformer control device 34 have been hereinbefore described as being connected in series, it will be appreciated that such windings may be connected in parallel for some applications of the device.

Figure 3:
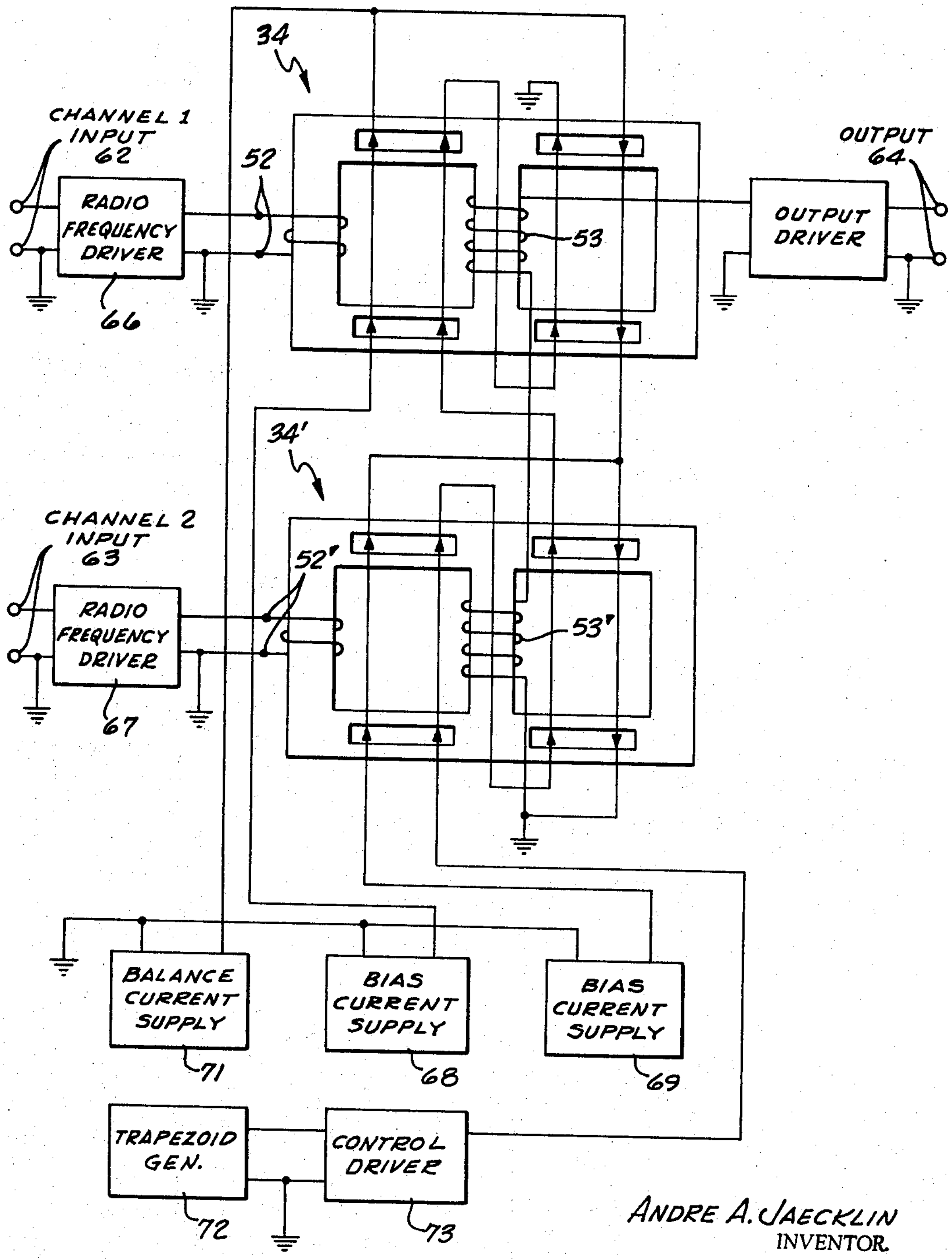
FIGURE 3 is a schematic circuit diagram of a slow switcher employing saturation controlled differential transformer control devices in accordance with the invention to facilitate switching between two channels and a common output of a rotary head magnetic tape recorder.

The differential transformer control device 34 may be employed in a variety of applications including slow switching between a plurality of signal channels such as multiple channels of a rotary head magnetic tape recorder, and a common output device. For example, as shown in FIGURE 3, a pair of differential transformer control devices 34, 34′ may be utilized to accomplish slow switching between rotary head broadband playback channels I and II of a magnetic video tape recorder connected to channel I and II input terminals 62 and 63, and a common output at terminals 64. In this regard it is desirable that the channel I signal be linearly decreased from a maximum level to zero while the channel II signal is complementarily increased from zero to maximum level, and vice versa, and that the signals be added at the output. The output is thus gradually switched from one input channel to the other. In the accomplishment of the slow switching function, channel I and II input terminals 62 and 63 are respectively connected to radio frequency drivers 66 and 67, in turn coupled in driving relation to the input terminals 52 and 52′ of the differential transformer control devices 34 and 34′. It should be noted that the input, output, bias, and control windings of each control device are arranged in a manner identical to that illustrated in FIGURE 2, and previously described, although in the schematic representation of the devices in FIGURE 3 various of the windings are omitted in the interest of simplicity. Flux induced in the core of each device by a signal applied to the input terminals 52 flows through balanced flux paths on opposite sides of the core and differentially through the center leg upon which the output winding 53 is wound. Bias flux and control flux induced in one side of the core (left side as viewed in FIGURE 3) are additive, and in the other side (right side as viewed in FIGURE 3) are subtractive. The levels of the input signals appearing in the output windings 53, 53' of devices 34, 34' are thus directly proportional to the control current applied to the devices.

In the energization of the control devices 34, 34' to effect the desired slow switching function, the bias windings on both sides of the device 34 and the bias windings on the subtractive sides (right side as viewed in FIGURE 3) of the device 34' are connected in series with a bias current supply 68. The bias windings on both sides of the device 34' are connected in series with a second bias current supply 69. Thus, the bias windings on both sides of control device 34 are energized by the current from supply 68. The bias windings on the additive side of control device 34' are energized by the current from supply 69. However, the bias windings on the subtractive sides of the latter device 34' are energized by the sum of the currents from both supplies 68, 69. A balance current supply 71 is coupled to the center tap of the serially connected bias windings of device 34 to provide any compensation required to balance the opposite sides of the core of device 34. Any balancing of the opposite sides of the core of control device 34' may be effected by slightly varying the magnitude of the current from bias supply 69. Control current is derived from a trapezoid generator 72 energizing a control driver 73, the output of which is connected in series with the control windings of both devices 34, 34'. The control driver is arranged to convert the trapezoid voltage from the generator 72 to a corresponding trapezoid control current. The trapezoid control current applied to the devices 34, 34' thus rises linearly from zero to a predetermined maximum, is constant at the maximum for a predetermined time increment, falls linearly from the predetermined maximum to zero, and is constant at zero for the predetermined time increment.

The bias supply 68 produces a bias current of magnitude $I_b$ while bias supply 69 provides a current magnitude $\frac{1}{2}I_b$. In addition, the predetermined maximum level $I_c$ of the control current from the output of driver 73 is adjusted equal to $\frac{1}{2}I_b$. Thus, by virtue of the wiring arrangement of the bias windings of the control devices 34, 34', both sides of control device 34 are energized with a bias current of magnitude $I_b$. The additive side of control device 34' is energized with a bias current of magnitude $\frac{1}{2}I_b$ while the subtractive side of the device is energized by the sum of bias currents from supplies 68, 69, i.e., bias current of $\frac{3}{2}I_b$. The differential between the additive and subtractive magnetizations of the opposite sides of the control device 34, in the absence of control current, is thus zero, whereas for control device 34' the differential is proportional to $I_b$. By virtue of this biasing arrangement, and the control current varying between zero and a maximum magnitude equal to $\frac{1}{2}I_b$, the output signals in windings 53 and 53' of the control devices 34 and 34' respectively vary in direct and inverse proportions to the control current between zero and maximum level.

The output windings 53, 53' of the respective control devices 34, 34' are serially connected to the input of an output driver 74, the output of which is coupled to output terminals 64. By virtue of the series connection of the output windings, the output signal at terminals 64 is proportional to the sum of the signals in the output windings of the control devices 34, 34'. Thus, for zero control current, the signal at output terminals 64 is the maximum level of the channel II input signals at terminals 63. As the control current gradually linearly increases from zero towards the maximum magnitude $I_c$, the differential between the magnetizations of the opposite sides of the device 34, and therefore the signal in output winding 53, increases in proportion to twice the magnitude of the control current. When the control current reaches maximum magnitude, i.e., $\frac{1}{2}I_b$, the maximum level of the channel I input signal at terminals 62 is coupled to the output winding 53. In control device 34', however, the differential between the additive and subtractive magnetizations of the opposite sides of the device decreases in proportion to twice the magnitude of the control current. Thus at maximum magnitude of the control current the magnetization differential is zero as is the signal in output winding 53'. The output signal at terminal 64 during the above-noted slow switching operation, proportional to the sum of the signals in output windings 53, 53', is thus substantially constant and comprised of a gradually increasing level of the channel I input signal and complementary gradually decreasing level of the channel II input signal until finally the output signal is the maximum level of the channel I signal. Subsequently, in response to the trailing edge of the trapezoid control current, the situation is reversed and the output signal is gradually switched from the channel I signal to the channel II signal.

Although the input windings of each control device of the switcher just described are connected in series as are the output windings of the respective control devices, it should be noted that for high frequency applications the input windings of each device are preferably connected in parallel as are the output windings of the respective devices.

Figure 4:
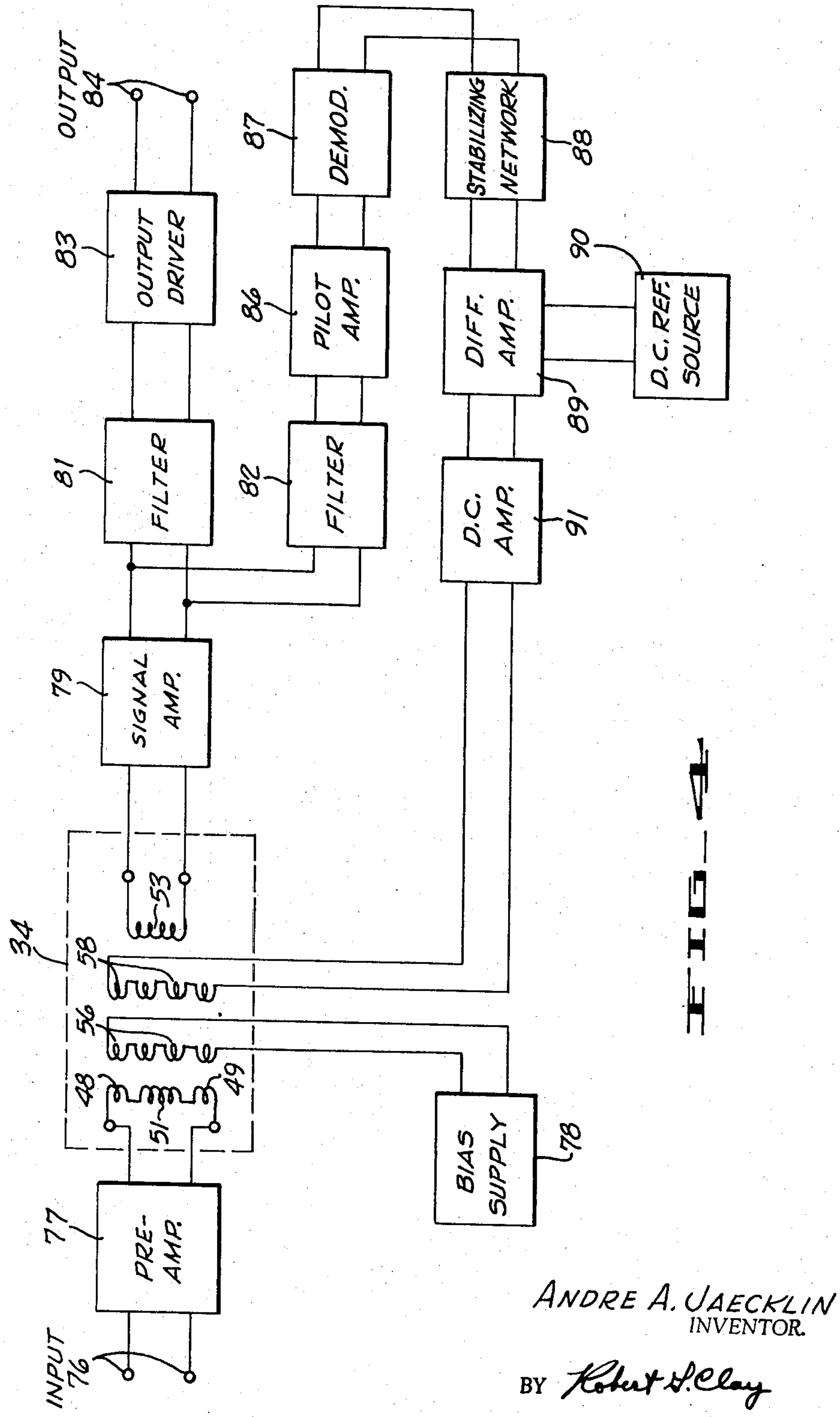
FIGURE 4 is a schematic circuit diagram of an automatic gain control employing a saturation controlled differential transformer control device in accordance with the invention.

The differential transformer control device 34 may also be employed in automatic gain control applications. An automatic gain control circuit utilizing the control device 34 is illustrated in FIGURE 4, which circuit is arranged to maintain a signal at a constant level by regulating the signal level in compensating relation to departures of a pilot component of the signal from a predetermined reference level. More particularly, an input signal such as the playback signal from a rotary head video tape recorder is applied to input terminals 76. The signal typically has undesirable amplitude variations arising from various imperfections in the playback mode arising from mismatch between different heads, tracking instabilities, poor switching, and the like. A pilot having a predetermined frequency is included in the signal and undergoes amplitude variations substantially identical to those of all other frequency components of the signal. The signal is applied to a preamplifier 77, in turn coupled to the input windings 48, 51, and 49 of the differential transformer control device 34. The preamplifier provides an adequate signal amplitude with very low internal impedance for the control device. The bias windings 56 are energized with a constant bias current from a bias supply 78 in the manner previously described. The control windings 58 are energized with a control current, derived in a manner subsequently described, which serves to vary the amplitude of the input signal transmitted to the output winding 53 of the control element in a manner to compensate the amplitude variations and maintain a constant output signal level. A signal amplifier 79 couples the output signal from the control device in parallel to high pass filters 81, 82 serving to separate the pilot from the remainder of the signal. The filter 81 also blocks any residual signal due to interaction between the magnetization flux in the core of the control device 34, and the signal windings. Filter 81 is coupled to an output driver 83 which in turn applies the signal to output terminals 84.

The pilot separated from the signal by filter 82 is amplified by a pilot amplifier 86, and the amplified pilot is demodulated by demodulator 87 to provide a direct current pilot varying in accordance with the amplitude variations of the signal at the output of the control device 34. A stabilizing network 88 couples the demodulator to one input of a differential amplifier 89, the other input of which is coupled to a direct current reference source 90.

A direct current amplifier 91 in turn couples the output of the differential amplifier to the control windings 58 of the control device 34. The differential amplifier and direct current amplifier function to develop an error control current which is inversely related to the difference between the pilot and reference. The error current varies above and below a predetermined current level for which the signal induced in the output winding 53 has the desired amplitude. Thus when the pilot increases, the control current correspondingly decreases to compensate the increase in signal amplitude designated by the pilot. Conversely, when the pilot decreases, the control current correspondingly increases to increase the signal amplitude. As a result, the control device 34 continuously regulates the signal towards the desired constant level, and a substantially constant level output signal appears at output terminals 84.

The control device 34 may be employed for numerous purposes in addition to those specifically described hereinbefore. The two halves of the primary winding of the device may be split into two separate inputs such that the output represents the vector addition of the inputs, and the device may thus be employed as an analog adder. In addition since the control device exhibits a linear characteristic passing through the origin and output is proportional to the product of input signal and control current, use of the device in analog multiplication applications is implied. In this regard, the device may be employed as an analog multiplier, AM modulator, balanced modulator, single side band modulator, frequency synthesizer, frequency multiplexer, etc. The device may also be used as a phase detector or time-base error detector since the low distortion of the device combined with its ability to cancel two signals makes the detection of very small phase angles between the two halves of the primary possible.

Although the invention has been hereinbefore described and illustrated in the drawings with respect to several specific embodiments, it will be appreciated that various changes and modifications may be made therein without departing from the spirit and the scope of the invention. For example, the legs which carry the control windings need not be slotted, although the slotted arrangement is preferred. Thus it is not intended to limit the invention except by the terms of the appended claims.

What is claimed is:

1. A control device comprising a ferromagnetic core having at least two outer portions and a central portion with opposed interconnecting portions therebetween defining a pair of closed loop flux paths having said central portion in common, control windings carried by said interconnecting portions for varying the reluctances thereof in response to the application of control current to said windings, control current supply means coupled to said control windings to apply control currents respectively thereto in mutual opposition, and first and second separate signal windings carried by said central portion and at least one of said outer portions linked therewith by one of said flux paths.

2. A control device according to claim 1, further defined by said core being of a material having a hysteresis loop of minimal squareness and enclosed area.

3. A control device comprising a ferromagnetic core having a central leg and a pair of outer legs spaced on opposite sides of said central leg, said core having pairs of opposed interconnecting legs respectively between the ends of said outer legs and said central leg and defining therewith a pair of closed loop flux paths having said central leg in common, control windings carried by at least one interconnecting leg of each of said pairs thereof for inducing control flux therein and varying the reluctance of said interconencting leg in accordance with current applied to said windings, control current supply means coupled to said control windings to apply mutually opposed control currents to respective ones of said control windings wound on different ones of said pairs of opposed interconnecting legs, interconnected input windings wound upon said outer legs with senses to induce equal fluxes in said outer legs in directions of mutual opposition in said central leg in response to the application of an input signal to said input windings, an input signal source coupled to said input windings, and an output winding wound upon said central leg.

4. A control device according to claim 3, further defined by bias windings carried by said interconnecting legs which carry control windings, said bias windings inducing bias flux in said interconnecting legs in accordance with current applied to said bias windings, and bias current supply means coupled to said bias windings, said control and bias windings being arranged to induce control and bias flux in additive relation in said interconnecting legs on one side of said central leg and to induce control and bias flux in subtractive relation in said interconnecting legs on the other side of said central leg.

5. A control device comprising a ferromagnetic core having a central unslotted leg and a pair of unslotted legs respectively outwardly spaced on opposite sides of said central leg, said core having pairs of slotted legs respectively connecting the ends of the outer unslotted legs to said central unslotted leg, control windings received by the slots of said slotted legs for inducing control flux therein and varying the reluctances thereof in accordance with direct current applied to said windings, an output winding wound upon said central unslotted leg, interconnected input windings wound upon said outer unslotted legs with senses to induce equal fluxes in said outer legs in directions of mutual opposition in said central leg in response to the application of an input signal to said input windings, an input signal source coupled to said input windings, bias windings received by the slots of said slotted legs for inducing bias flux therein in accordance with direct current applied to said bias windings, said control and bias windings being arranged to induce control and bias flux in additive relation in said slotted legs connecting one of said outer unslotted legs to said central unslotted leg and to induce control and bias flux in substractive relation in said slotted legs connecting the other of said outer unslotted legs to said central unslotted leg, and direct current control and bias supplies connected to said control and bias windings to apply control and bias currents thereto.

6. A control device comprising a substantially rectangular core of ferromagnetic material having a pair of spaced substantially rectangular apertures therein defining a transverse central leg and parallel outer transverse legs longitudinally spaced on opposite sides of said central leg, said outer transverse legs respectively connected at their opposite ends to the opposite ends of said central leg by first and second pairs of opposed parallel spaced longitudinal legs, said longitudinal legs respectively having centrally longitudinally extending slots therein, pairs of control windings respectively received by said slots and wound with opposite senses on opposite longitudinal sides thereof to induce flux in said longitudinal legs encircling said slots in response to the application of control current to said windings, an input winding wound upon said central transverse leg, an output winding wound upon at least one of said outer transverse legs, and control current supply means coupled to said control windings wound on said first and second longitudinal legs to apply control current thereto in mutual opposition.

7. A control device according to claim 6, further defined by said slots being outwardly offset from said central leg.

8. A control device comprising a substantially rectangular core of ferromagnetic material having a hysteresis loop of minimal squareness and enclosed area, said core having a pair of spaced substantially rectangular apertures thereon defining a transverse central leg and parallel outer transverse legs longitudinally spaced on opposite sides of said central leg, said outer transverse legs respectively connected at their opposite ends to the opposite ends of said central transverse leg by first and second pairs of opposed parallel spaced longitudinal legs, said longitudinal legs respectively having centrally longitudinally extending slots therein, pairs of control windings respectively received by said slots and wound with opposite senses on opposite longitudinal sides thereof to induce control flux in said longitudinal legs encircling said slots in response to the application of control current to said windings, pairs of bias windings respectively received by said slots and wound with opposite senses on opposite longitudinal sides thereof to induce bias flux in said longitudinal legs encircling said slots in response to the application of bias current to said bias windings, said control and bias windings being arranged to induce control and bias flux in additive relation in said first pair of longitudinal legs and in subtractive relation in said second pair of longitudinal legs, a direct current control supply serially connected to said control windings, a direct current bias supply serially connected to said bias windings, serially connected differentially wound input windings carried upon said outer transverse legs for inducing equal fluxes therein in directions of mutual opposition in said central leg in response to the application of an alternating current input signal to said input windings, an alternating current input signal source connected to said input windings, and an output winding wound upon said central leg.

9. A control device according to claim 8, further defined by a balance current source connected to a common point between said bias windings wound respectively on said first and second pairs of longitudinal legs.

10. A slow switch for switching between a pair of signal channels and a common output comprising a pair of substantially rectangular ferromagnetic cores each having a pair of spaced substantially rectangular apertures therein defining a transverse central leg and parallel outer transverse legs longitudinally spaced on opposite sides thereof with first and second pairs of opposed longitudinal legs respectively connecting opposite ends of said outer transverse legs to the opposite ends of said central transverse leg, control windings carried by said longitudinal legs to induce control flux therein in response to control current flowing in said control windings, bias windings carried by said longitudinal legs to induce bias flux therein in response to bias current flowing in said bias windings, said control and bias windings associated with each core being arranged to induce control and bias flux in additive relation in said first pair of longitudinal legs thereof and to induce control and bias flux in subtractive relation in said second pair of longitudinal legs thereof, input windings carried upon said outer transverse legs of each core for inducing equal fluxes therein in directions of mutual opposition in said central leg thereof in response to a signal current flowing in said input windings, an output winding wound upon the central leg of each of said cores, means respectively coupling the input windings associated with said pair of cores to said pair of signal channels, means coupling said output windings associated with said pair of cores to said common output, means energizing said bias windings on said first and second pairs of longitudinal legs of said first of said cores with a direct current bias having a predetermined magnitude, means energizing said bias windings on said first pair of longitudinal legs of said second core with a bias current equal to one-half said predetermined magnitude, means energizing said bias windings on said second pair of longitudinal legs of said second core with a bias current equal to three-halves said predetermined magnitude, and means energizing said control windings on said first and second pairs of longitudinal legs of said first and second cores in series with a trapezoidal control current varying between zero and one-half said predetermined magnitude.

11. A slow switch for switching between a pair of signal channels and a common output comprising a pair of substantially rectangular ferromagetic cores each having a pair of spaced substantially rectangular apertures therein defining a transverse central leg and parallel outer transverse legs longitudinally spaced on opposite sides thereof with first and second pairs of opposed longitudinal legs respectively connecting opposite ends of said outer transverse legs to the opposite ends of said central transverse leg, said longitudinal legs respectively having centrally longitudinal extending slots therein, pairs of control windings respectively received by said slots and wound with opposite senses on opposite longitudinal sides thereof to induce control flux in said longitudinal legs encircling said slots in response to control current flowing in said control windings, pairs of bias windings respectively received by said slots and wound with opposite senses on opposite longitudinal sides thereof to induce bias flux in said longitudinal legs encircling said slots in response to bias current flowing in said bias windings, said control and bias windings associated with each core being arranged to induce control and bias flux in additive relation in said first pair of longitudinal legs thereof and to induce control and bias flux in subtractive relation in said second pair of longitudinal legs thereof, serially connected differentially wound input windings carried upon said outer transverse legs of each core for inducing equal fluxes therein in directions of mutual opposition in said central leg thereof in response to a signal current flowing in said input windings, an output winding wound upon the central leg of each of said cores, means respectively coupling the input windings associated with said pair of cores to said pair of signal channels, means coupling said output windings associated with said pair of cores in additive series with said common output, means energizing said bias windings on said first and second pairs of longitudinal legs of said first of said cores with a direct current bias having a predetermined magnitude, means energizing said bias windings on said first pair of longitudinal legs of said second core with a bias current equal to one-half said predetermined magnitude, means energizing said bias windings on said second pair of longitudinal legs of said second core with a bias current equal to three-halves said predetermined magnitude, and a control current supply serially connected to said control windings on said first and second pairs of longitudinal legs of said first and second cores for generating a trapezoidal control current varying between zero and one-half said predetermined magnitude.

12. A slow switcher for switching between a pair of signal channels and a common output comprising a pair of substantially rectangular ferromagnetic cores each having a pair of spaced substantially rectangular apertures therein defining a transverse central leg and parallel outer transverse legs longitudinally spaced on opposite sides thereof with first and second pairs of opposed longitudinal legs respectively connecting the opposite ends of said outer transverse legs to the opposite ends of said central transverse leg, said longitudinal legs respectively having centrally longitudinally extending slots therein, pairs of control windings respectively received by said slots and wound with opposite senses on opposite longitudinal sides thereof to induce control flux in said longitudinal legs encircling said slots in response to control current flowing in said control windings, pairs of bias windings respectively received by said slots and wound with opposite senses on opposite longitudinal sides thereof to induce bias flux in said longitudinal legs encircling said slots in response to bias current flowing in said bias windings, said control and bias windings associated with each core being arranged to induce control and bias flux in additive relation in said first pair of longitudinal legs thereof and to induce control and bias flux in subtractive relation in said second pair of longitudinal legs thereof, serially connected differentially wound input windings carried upon said outer transverse legs of each core for inducing equal fluxes therein in directions of mutual opposition in said central leg thereof in response to a signal current flowing in said input windings, an output winding wound upon the central leg of each of said cores, means respectively coupling the input windings associated with said pair of cores to said pair of signal channels, means coupling said output windings associated with said pair of cores in additive series with said common output, a first direct current bias supply, means serially connecting said bias windings on said first and second pairs of longitudinal legs of a first of said cores and said bias windings on said second pair of longitudinal legs of the second of said cores to said first bias supply, a second direct current bias supply, means serially connecting said bias windings on said first and second pairs of longitudinal legs of said second core to said direct current bias supply, said bias windings on said second pair of longitudinal legs of said second core being thereby energized with the sum of said currents from said first and second bias supplies, said first bias supply generating a bias current of predetermined magnitude, said second bias supply generating a bias current of one-half said predetermined magnitude, and a control current supply serially connected to said control windings on said first and second pairs of longitudinal legs of said first and second cores for generating a trapezoid control current varying between zero and one-half said predetermined magnitude.

References Cited

UNITED STATES PATENTS

| | | | |
|---|---|---|---|
| 2,073,458 | 3/1937 | Silent | 333—2 X |
| 2,519,426 | 8/1950 | Grant | 307—112 |
| 2,985,817 | 5/1961 | Bird | 323—56 |
| 3,158,692 | 11/1964 | Gerkensmeier | 333—7 X |
| 3,204,204 | 8/1965 | Buxton et al. | 333—1.1 |
| 3,229,186 | 1/1966 | Lafuze | 321—18 |
| 3,259,832 | 7/1966 | Summerer | 323—48 X |
| 3,316,358 | 4/1957 | Guisinger | 179—100.2 |

FOREIGN PATENTS

| | | |
|---|---|---|
| 711,771 | 10/1941 | Germany. |
| 966,904 | 9/1957 | Germany. |

JOHN F. COUCH, *Primary Examiner.*

WARREN E. RAY, *Examiner.*